United States Patent
Velusamy et al.

(10) Patent No.: US 10,742,763 B2
(45) Date of Patent: Aug. 11, 2020

(54) DATA LIMIT AWARE CONTENT RENDERING

(71) Applicant: PayPal, Inc., San Jose, CA (US)

(72) Inventors: Lakshmanan Velusamy, Bellevue, WA (US); Suriya Prakash Kalivardhan, Bellvue, WA (US)

(73) Assignee: PayPal, Inc., San Jose, CA (US)

( * ) Notice: Subject to any disclaimer, the term of this patent is extended or adjusted under 35 U.S.C. 154(b) by 151 days.

(21) Appl. No.: 14/469,444

(22) Filed: Aug. 26, 2014

(65) Prior Publication Data

US 2016/0065687 A1 Mar. 3, 2016

(51) Int. Cl.
| | | |
|---|---|---|
| *G06F 17/00* | (2019.01) | |
| *H04L 29/08* | (2006.01) | |
| *G06F 16/957* | (2019.01) | |
| *H04W 4/18* | (2009.01) | |
| *G06F 40/166* | (2020.01) | |

(52) U.S. Cl.
CPC ...... *H04L 67/2828* (2013.01); *G06F 16/9577* (2019.01); *H04W 4/18* (2013.01); *G06F 40/166* (2020.01); *H04L 67/02* (2013.01)

(58) Field of Classification Search
CPC .... G06F 15/16; G06F 3/0867; G06F 16/9577; G06F 40/166; G06C 30/00; H04L 12/26; H04L 67/2828; H04L 67/02; G06Q 30/00; H04W 4/18
USPC .......................... 715/238; 370/252; 705/14.66
See application file for complete search history.

(56) References Cited

U.S. PATENT DOCUMENTS

| | | | | |
|---|---|---|---|---|
| 6,300,947 | B1* | 10/2001 | Kanevsky | G06F 17/30905 707/E17.121 |
| 8,949,322 | B2* | 2/2015 | Patrawala | G06F 17/3089 709/203 |
| 9,124,436 | B2* | 9/2015 | Kashanian | H04L 12/1417 |
| 9,456,050 | B1* | 9/2016 | Lepeska | H04L 67/2847 |
| 9,619,127 | B2* | 4/2017 | Varner | G06F 3/04847 |
| 9,912,718 | B1* | 3/2018 | Lepeska | H04L 67/02 |
| 2003/0093520 | A1* | 5/2003 | Beesley | H04L 12/14 709/224 |
| 2007/0283036 | A1 | 12/2007 | Dey et al. | |
| 2009/0088188 | A1 | 4/2009 | Wormald et al. | |
| 2009/0234909 | A1* | 9/2009 | Strandell | G06F 17/30528 709/203 |

(Continued)

FOREIGN PATENT DOCUMENTS

WO WO-2016033060 A1 3/2016

OTHER PUBLICATIONS

"International Application No. PCT/US2015/046720, International Search Report dated Nov. 24, 2015", 2 pgs.

(Continued)

*Primary Examiner* — William L Bashore
*Assistant Examiner* — David Faber (57) ABSTRACT

A content rendering system to provide data limit aware content rendering is described. The content rendering system is configured to dynamically and in real time build, based on content requested from a client device, and based on and the data limit values associated with the requesting client device, a modified light version of the requested content that is less data intensive than the requested content. The content rendering system may provide the modified version of the requested content to the client device.

20 Claims, 4 Drawing Sheets

(56) References Cited

U.S. PATENT DOCUMENTS

| | | | | |
|---|---|---|---|---|
| 2010/0017506 A1* | 1/2010 | Fadell | | H04M 15/00 709/224 |
| 2011/0083082 A1 | 4/2011 | Gottwald et al. | | |
| 2011/0208801 A1* | 8/2011 | Thorkelsson | | H04L 67/2814 709/203 |
| 2011/0258049 A1* | 10/2011 | Ramer | | G06F 17/30867 705/14.66 |
| 2012/0030341 A1* | 2/2012 | Jensen | | H04L 67/2804 709/224 |
| 2012/0155296 A1* | 6/2012 | Kashanian | | H04L 12/1417 370/252 |
| 2012/0192080 A1* | 7/2012 | Lloyd | | H04L 67/32 715/744 |
| 2013/0023230 A9 | 1/2013 | Momtahan et al. | | |
| 2013/0196615 A1* | 8/2013 | Zalmanovitch | | H04M 15/765 455/405 |
| 2013/0196621 A1* | 8/2013 | Guday | | H04W 24/02 455/406 |
| 2013/0346624 A1* | 12/2013 | Chervets | | H04M 15/58 709/231 |
| 2014/0113586 A1 | 4/2014 | Leemet et al. | | |
| 2014/0237081 A1* | 8/2014 | Zhu | | H04L 67/327 709/219 |
| 2014/0248852 A1* | 9/2014 | Raleigh | | H04M 15/723 455/407 |
| 2014/0359405 A1* | 12/2014 | Hou | | G06F 16/9577 715/202 |
| 2015/0039635 A1* | 2/2015 | Monjas Llorente | | H04L 65/605 707/754 |
| 2015/0065084 A1* | 3/2015 | Sheikh Naziruddin | | H04M 15/7652 455/406 |
| 2015/0169509 A1* | 6/2015 | Seshadri | | G06Q 30/0267 705/14.64 |
| 2015/0271689 A1* | 9/2015 | Rout | | H04L 43/0876 709/217 |
| 2015/0381826 A1* | 12/2015 | Marimuthu | | H04M 15/886 455/405 |
| 2018/0309817 A1* | 10/2018 | Agrawal | | H04L 67/04 |

OTHER PUBLICATIONS

"International Application No. PCT/US2015/046720, Written Opinion dated Nov. 24, 2015", 5 pgs.

\* cited by examiner

DATA LIMIT AWARE CONTENT RENDERING

TECHNICAL FIELD

This application relates to the technical fields of software or hardware technology and, in one example embodiment, to system and method to provide data limit aware content rendering.

BACKGROUND

A network access provider may require customers to subscribe to a particular data plan that limits utilization of the network connection over time by a computing device. Network users may be conscious about the network data limit afforded to them by their data plan, especially when accessing web sites through their mobile devices. Some users may even choose to ignore those web sites that are known to consume large amounts of data.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Method and system are described for utilizing data limit aware content rendering. In the following description, for purposes of explanation, numerous specific details are set forth in order to provide a thorough understanding of example embodiments. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goat. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

As explained above, a network access provider (e.g., an Internet access provider) may require customers to subscribe to a particular data plan that limits utilization of the network connection over time by a computing device. A network data plan may include a certain data rate, as well as a bandwidth cap. A bandwidth cap places a quota (a limit) on a volume of data that can be transferred, via the computing device, over the network connection during a specified time period (e.g., one month). Exceeding the bandwidth limit specified by the data plan may result, in some cases, in termination of the network access, in incurring extra fees by the customer, or in throttling of the customer's Internet connection to a lower data rate. For the purposes of this description, restrictions or limitations with respect to utilization of the network connection by a user may be referred to as a network data limit or merely a data limit.

Network users (e.g., Internet users) may be conscious about the network data limit afforded to them by their data plan, especially when accessing network sites through their mobile devices. Some users may even choose to ignore those web sites that are known to consume large amounts of data, such as web sites that contain high-resolution images and other data-intensive content items.

Method and system are described for rendering web pages in a manner that takes into account the data plan constraints associated with the user's computing device. A computer-implemented system configured to examine the user's data limit parameters may be referred to as a data limit aware content rendering system, or, for the purposes of this description, merely a content rendering system. Example embodiments are described with reference to the Internet, while the method and system for rendering web pages in a manner that takes into account the data plan constraints associated with the user's computing device may be utilized beneficially with respect to any network access that may be constrained by a data plan.

In operation, according to one example embodiment, a web application server receives a request for content (e.g., a request to access a web page) from a client device. The requested content may be referred to as subject content. Subject content may be a subject web page. In response to the request for a subject web page, a content rendering system, which may be part of, or cooperate with, a web application server, determines that the network access of the client device is constrained by a data plan and obtains, from the client device, respective values of one or more data limit parameters associated with the data plan. The values of the data limit parameters may also be referred to as merely data limit values. The data limit values may reflect the network data usage of the client device, such as a bandwidth cap and an amount of data available to the user until the data is "refilled" at the expiration of a predefined time period. Other values of the user's data limit parameters may include a number of days left for the next renewal of data and, with respect to a particular web application, how often the client device is utilized to access that particular web application.

Based on the data limit values and also based on an examination of the requested web page, the content rendering system determines whether and how to reduce the amount of data to be transferred to the client device with the least impact on the user's data consumption, while still conveying the information presented on the subject web page. The content rendering system may be configured to dynamically and in real time build, based on the subject web page and the data limit values, a modified web page that is less data intensive than the subject web page. This approach may also improve a delivery time and a load time of the requested content, which may contribute to the improvement of the user's experience, and may obviate a need for certain efforts or resources that otherwise would be involved in providing the subject web page. Computing resources used by one or more machines, databases, or devices may similarly be reduced. Examples of such computing resources include processor cycles, network traffic, memory usage, data storage capacity, power consumption, and cooling capacity.

In one embodiment, the content rendering system may utilize one or more of several techniques to create a modified web page that is less data intensive than the subject web page. For example, the content rendering system may be configured to detect so-called heavy weight content objects (also referred to as containers) that are present on the subject web page (e.g., high resolution images or videos) and either not include such objects in the modified web page or convert a heavy weight object into a lesser weight object prior to including it in the modified web page. For instance, a high resolution image may be converted into a lower resolution image to reduce the size of the image. It will be noted that, in some embodiments, the modification of one or more objects present on the subject web page and the creation of a modified web page is not based on pre-determined parameters (e.g., a predetermined reduction of the number of pixels in an image), but is rather a dynamic process, which is based on the determined data limit values with respect to a particular client device at the time of the request for content.

Other ways to reduce data intensity of a web page include analyzing the subject web page and attaching respective priority or rank values to the objects or containers found on the web page. For example, images of items that are being offered for sale in the context of a web application related to on-line shopping may be assigned a high priority value, while images related to advertisements may be assigned a lower priority value. Thus, the dynamic rendering of objects on a modified web page to reduce the bandwidth required to transmit the page may include modifying certain objects on the page (e.g., reducing resolution of an image) or removing certain objects (e.g., instead of presenting all recommended items on a web page related to an on-line trading platform, presenting a fewer number of recommended items).

In one example embodiment, in order to determine by how much to reduce the quality of the subject web page or the quality of an image based on the data limit values the following attributes may be utilized. Data Left, # of days left, Users historical usage (KiloBytes/data per day, # of sites visited per day). In one scenario, a content rendering system may determine that a client device is associated with a data plan that provides a data limit of 1000 MB per a thirty day period, and that the current date is day 21 of the period. The content rendering system may also determine that 500 MB of the 1000 MB has been used and that, historically, the client device consumes on average 25 MB per day and accesses on average 30 sites per day. Since the projected use of the network bandwidth for the client device is 30*25 MB=750 MB per period, the client device is not expected to exceed the data limit at all, and therefore the content rendering system refrains from performing compression/reduction of the requested web page. In another scenario, a content rendering system may determine that a client device is associated with a data plan that provides a data limit of 1000 MB per a thirty one day period, that the current date is day 21 of the period, that 800 MB of the 1000 MB has been used and that, historically, the client device consumes on average 40 MB per day and accesses on average 80 sites per day. Since the projected use of the network bandwidth for the client device is 400 MB during the remaining ten days, but the remaining data limit is 200 MB, the content rendering system may attempt to reduce the size of the requested web page by 50%.

In one embodiment, the data limit information is may be transmitted from a client device to a web application server through a Hypertext Transfer Protocol (HTTP) packet from the client device. An operating system installed on a client device may include a user interface that can be data limit aware, that can whitelist/blacklist certain applications and/or websites, that can offer data limit aware rendering of content, that can determine by how much to reduce the size of the requested web page, etc. The client device may include this information in the content request header (e.g., the request header in the case of the HTTP protocol) or offer service permitting a web application server to obtain data limit values based on the total bytes received/sent at the client device, based on the user identification associated with the client device. This information may be used to derive hourly/daily/monthly statistics with respect to the transferred data.

Figure 1:
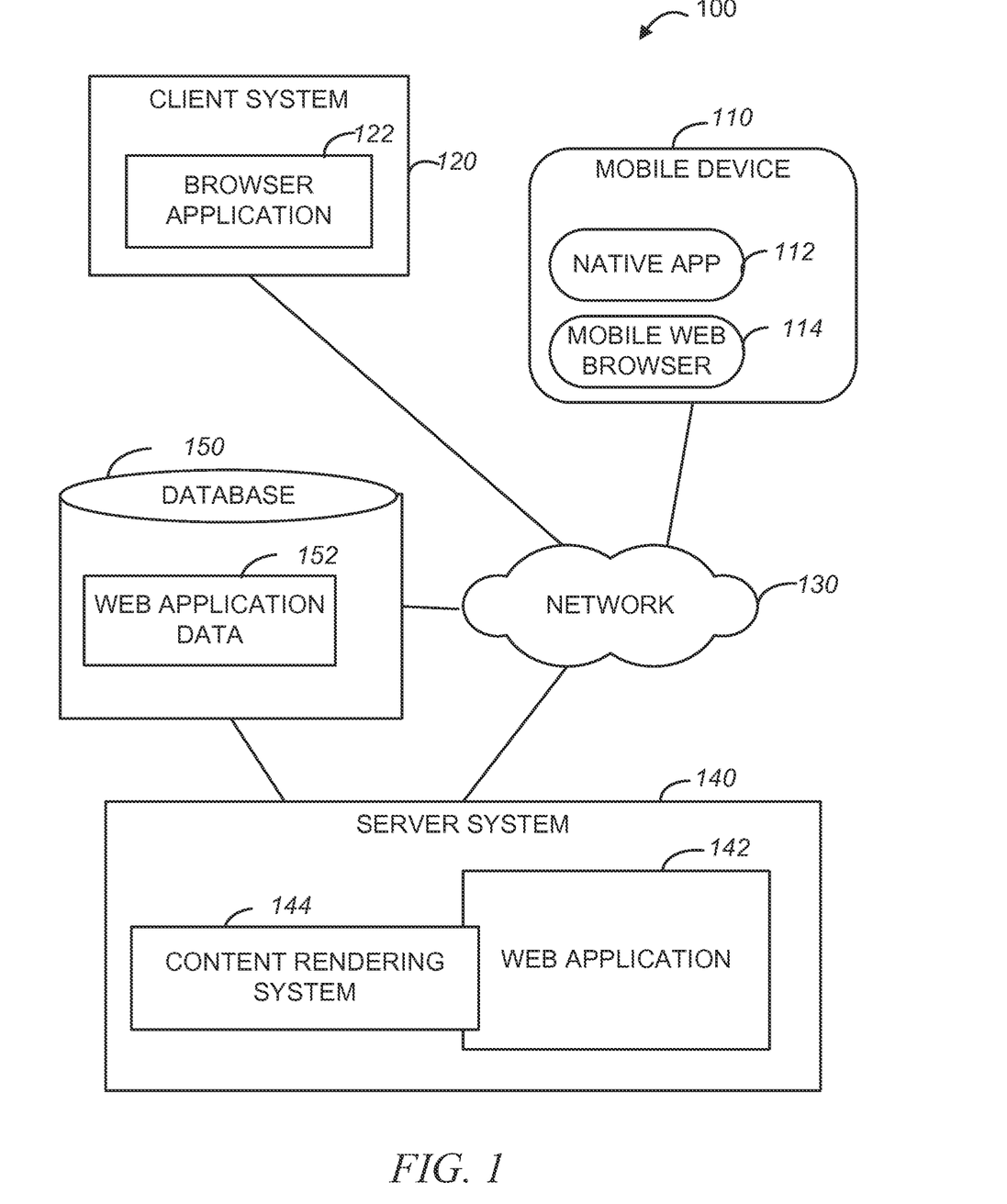
FIG. 1 is a diagrammatic representation of a network environment within which an example method and system to provide data limit aware content rendering may be implemented.

An example method and system to provide data limit aware content An example method and system to provide data limit aware content rendering may be implemented in the context of a network environment 100 illustrated in FIG. 1. As shown in FIG. 1, the network environment 100 may include client devices 110 and 120, and a server system 140. The client device 110 may be a mobile device executing a native app 112 or a mobile web browser 114. The native app 112 may be providing access to services executing on the server system 140, such as, for example, to services provided by a web application 142. The client devices 110 and 120 (e.g., via a browser application 122) may have access to the server system 140 hosting the web application 142 via a communications network 130. The communications network 130 may be a public network (e.g., the Internet, a mobile communication network, or any other network capable of communicating digital data).

As shown in FIG. 1, the server system 140 is in communication with a database 150 that stores web application data 152. The server system 140 also hosts a content rendering system 144. In one example embodiment, the content rendering system 144 is configured to dynamically and in real time build, based on the subject content requested from the client device 110 or the client device 120, and based on the data limit values associated with the requesting client device, a modified version of the requested content that is less data intensive than the requested content. As explained above, the content rendering system 144 may determine that the network access of the client device is constrained by a data plan and data limit values associated with the data plan obtained from the client device (e.g., client devices 110 or 120). The data limit values may include the bandwidth cap and the amount of data available to the user until the data is "refilled" at the expiration of a predefined time period, as well as the number of days left for the next renewal of data, the frequency with which the client device accesses a particular web application, etc. Based on the data limit values and also based on the examination of the requested web page, the content rendering system 144 determines whether and how to reduce the amount of data to be transferred to the client computer with the least impact on the user's data consumption, while still conveying the information presented on the subject web page. An example content rendering system 144 that includes functionality to provide data limit aware content rendering is illustrated in FIG. 2.

Figure 2:
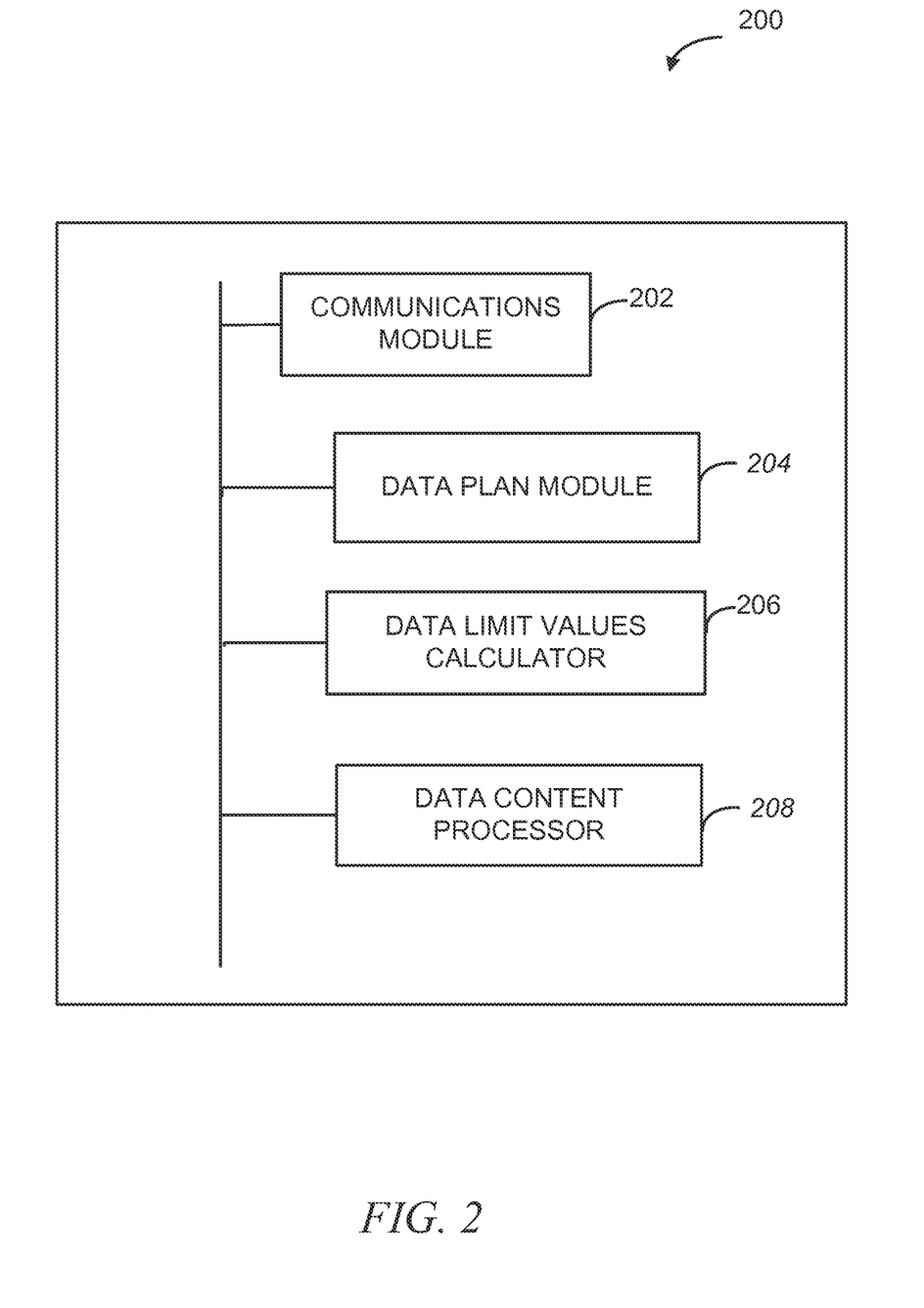
FIG. 2 is block diagram of a system to provide data limit aware content rendering, in accordance with one example embodiment.

FIG. 2 is a block diagram of a system 200 to provide data limit aware content rendering, in accordance with one example embodiment. As shown in FIG. 2, the system 200 includes a communications module 202, a data plan module 204, a data limit values calculator 206, and a data content processor 208. The communications module 202 may be configured to receive, at the server computer system 140 of FIG. 1, a request for a subject web page from a client device. A client device may be, for example, the client system 120 of FIG. 1 or the mobile device 110 of FIG. 1. The communications module 202 may also be configured to communicate to the client device a request to permit access to the data plan information representing constraints on the utilization of the network connection over time by the client device. The communications module 202 may also be configured to communicate content to the client device, in response to the request for the subject web page. The content communicated to the client device may be the requested subject web page or a modified version (e.g., a light version), of the subject web page. A modified web page may be generated such that, for example, it utilizes less bandwidth than the subject web page.

The data plan module 204 may be configured to obtain, from the client device, data plan information. As mentioned above, the data plan information represents one or more constraints with respect to network access via the client device. The data limit values calculator 206 may be configured to derive, from the data plan information, data limit values. The data limit values may include a value indicating a maximum amount of data that can be transmitted over the network using the client device over a period of time, where the period of time starts on a predetermined calendar date. The data limit values may also include a value indicating an amount of data that has been transmitted over the network since the predetermined calendar date. The data limit values may further include a value indicating a remaining time period with respect to an expiration of the period of time starting on the predetermined calendar date.

The data content processor 208 may be configured to generate, dynamically in response to the request for the subject web page, a modified web page, based on the subject web page and the data limit values. In one embodiment, the data content processor 208 may be configured to omit, from the modified web page, one or more objects from a plurality of data objects present on the subject web page comprising the plurality of data objects. The omitted object may be termed a secondary data Object. The data content processor 208 may be configured to determine respective importance indicators for the one or more data objects present in the subject web page. A secondary object selected to be omitted from the modified web page may be associated with a lower importance indicator as compared to respective importance indicators of other data objects present on the web page. In some embodiments, the data content processor 208 may be configured to reduce a size of an image data object present in the subject web page and to include, into the modified web page, the reduced size data object in place of the image data object. Example operations performed by the system 200 are described with reference to FIG. 3.

Figure 3:
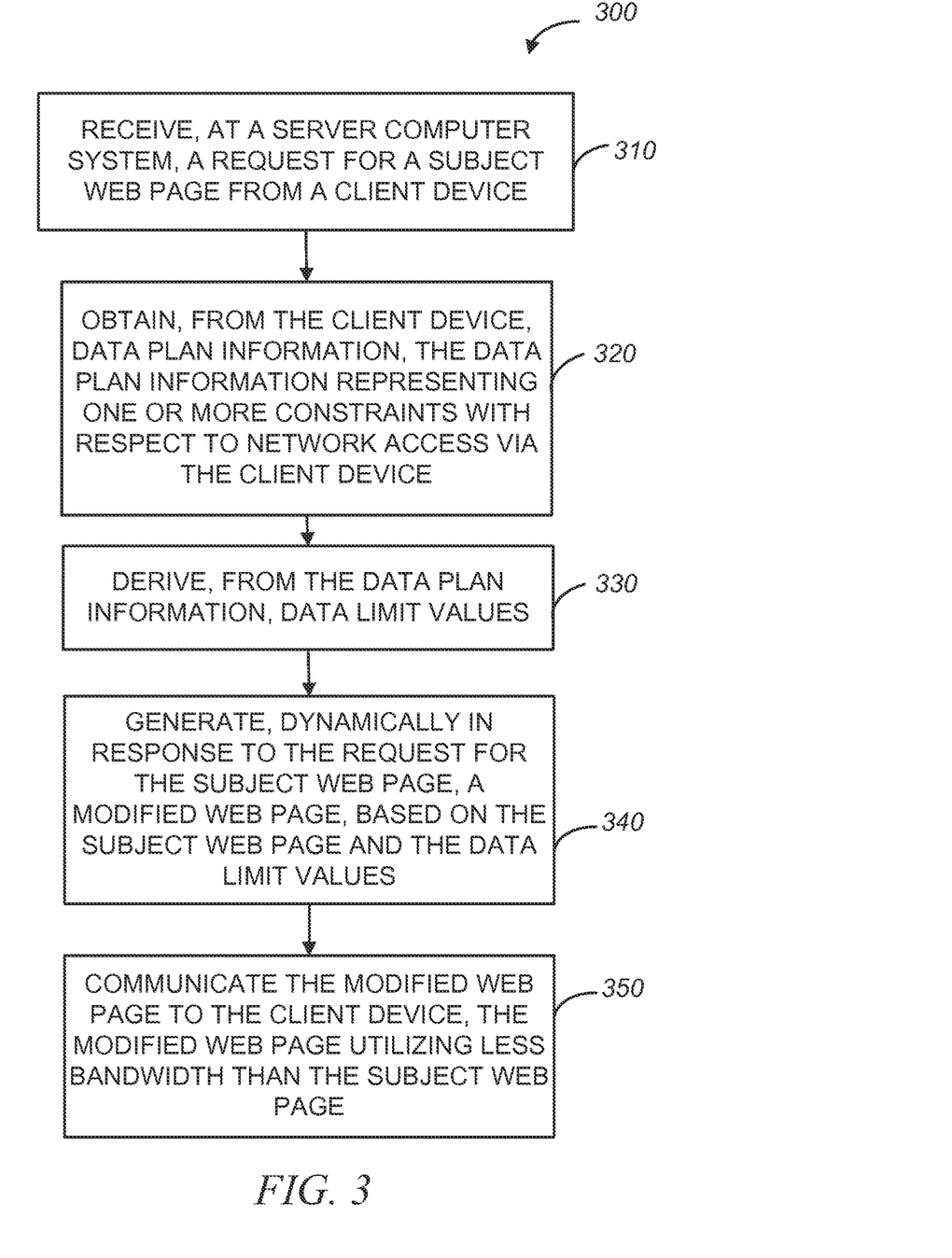
FIG. 3 is a flow chart of a method to provide data limit aware content rendering, in accordance with an example embodiment.

FIG. 3 is a flow chart of a method 300 to provide data limit aware content rendering, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1.

As shown in FIG. 3, the method 300 commences at operation 310, when the communications module 202 of FIG. 2 receives, at the server computer system 140 of FIG. 1, a request for a subject web page from a client device. The client device may be, for example, a mobile device. The communications module 202 may also be configured to communicate to the client device a request to permit access to the data plan information representing constraints on the utilization of the network connection over time by the client device. The communications module 202 may also be configured to communicate content to the client device content, in response to the request for the subject web page. The content communicated tote client device may be the requested subject web page or a modified version (e.g., a light version) of the subject web page. A modified web page may be generated such that it utilizes less bandwidth than the subject web page.

At operation 320, the data plan module 204 of FIG. 2 obtains, from the client device, data plan information. As mentioned above, the data plan information represents one or more constraints with respect to network access via the client device.

At operation 330, the data limit values calculator 206 of FIG. 2 derives, from the data plan information, data limit values. The data limit values may include, for example, a value indicating a maximum amount of data that can be transmitted over the network using the client device over a period of time, a value indicating an amount of data that has been transmitted over the network since the predetermined calendar date, a value indicating a remaining time period with respect to an expiration of the period of time starting on the predetermined calendar date, etc.

At operation 340, the data content processor 208 of FIG. 2 generates, dynamically in response to the request for the subject web page, a modified web page, based on the subject web page and the data limit values. As explained above, a modified web page may be generated by omitting, from the modified web page, one or more objects from a plurality of data objects present on the subject web page comprising the plurality of data objects. The omitted object, which may be termed a secondary data object may be associated with a lower importance indicator as compared to respective importance indicators of other data objects present on the web page. A modified web page may also be generated by reducing the size of an image data object present in the subject web page and by including, into the modified web page, the reduced size data object in place of the image data object. At operation 350, the communications module 202 communicates the modified web page to the client device.

Figure 4:
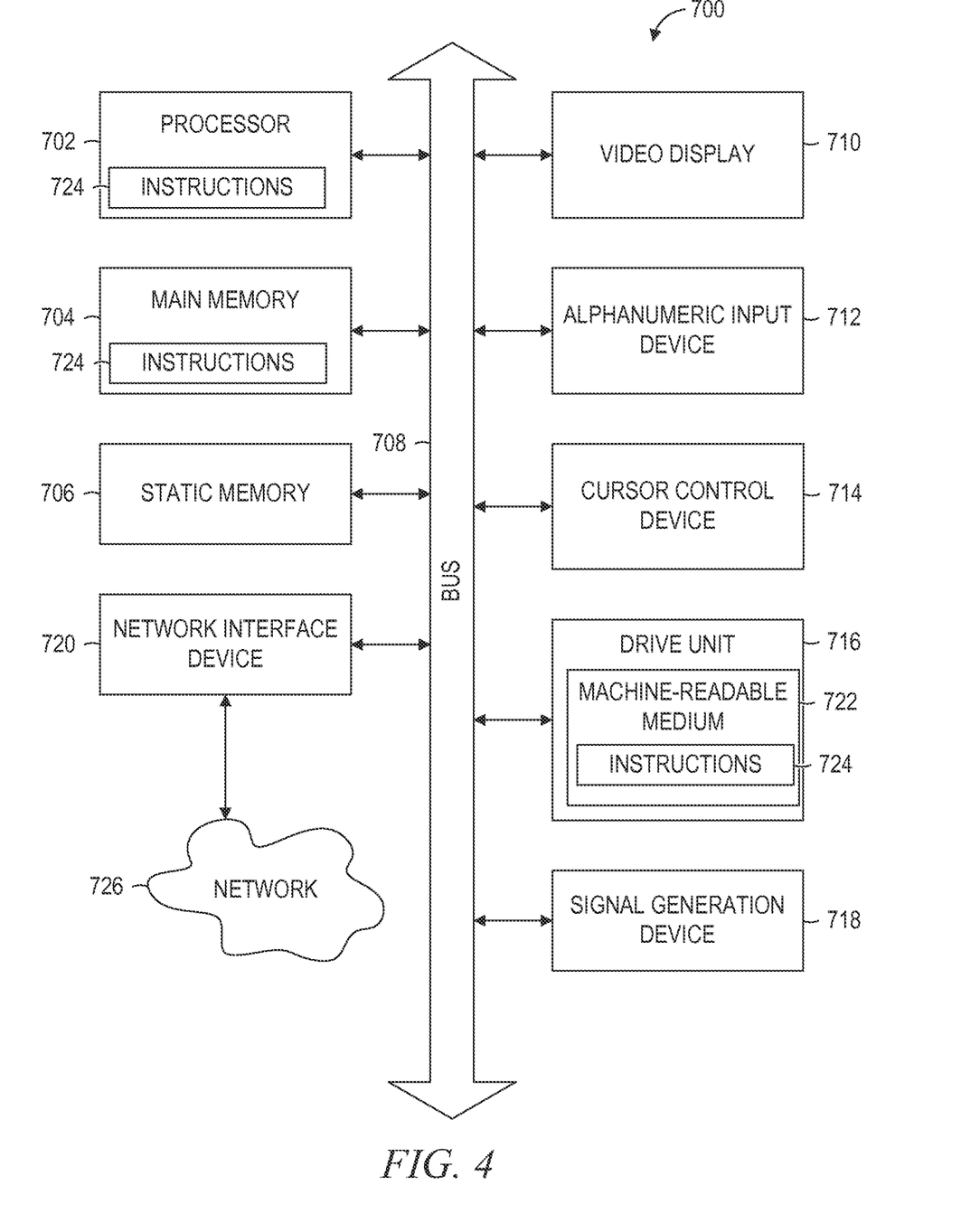
FIG. 4 is a diagrammatic representation of an example machine in the form of a computer system, within which a set of instructions, for causing the machine to perform any one or more of the methodologies discussed herein, may be executed.

FIG. 4 is a diagrammatic representation of a machine in the example form of a computer system 700 within which a set of instructions, for causing the machine to perform any one or more of the methodologies discussed herein, may be executed. In alternative embodiments, the machine operates as a stand-atone device or may be connected (e.g., networked) to other machines. In a networked deployment, the machine may operate in the capacity of a server or a client device in a server-client network environment, or as a peer machine in a peer-to-peer or distributed) network environment. The machine may be a personal computer (PC), a tablet PC, a set-top box (STB), a Personal Digital Assistant (PDA), cellular telephone, a mobile device, a web appliance, a network router, switch or bridge, or any machine capable of executing a set of instructions (sequential or otherwise)

that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (CPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a drive unit 716, a signal generation device 718 (e.g., a speaker) and a network interface device 720.

The drive unit 716 includes a machine-readable medium 722 on which is stored one or more sets of instructions and data structures (e.g., instructions 724) embodying or utilized by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable media.

The instructions 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may a so operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to provide data limit aware content rendering has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A method comprising:
receiving, at a server computer system that hosts a web application configured to render a subject web page, a request for the subject web page from a client device;
in response to receiving the request for the subject web page, obtaining, from the client device by the server computer system that receives the request for the subject web page, data limit values including: a total amount of data, as provided over a network of a network access provider, available for use by the client device under a particular data plan of the network access provider over a predefined period of time, and a remaining amount of data available for use by the client device for a current predefined period of time from when the request is received to when the current predefined period of time expires;
determining, by the server computer system that receives the request for the subject web page, a projected usage of data by the client device over a remaining time of the current predefined period of time from when the request is received based on a number of days left in the current predefined period of time and an historical average amount of data used by the client device per day;
in response to determining that the projected usage of data by the client device is greater than the remaining amount of data available for use by the client device for the current predefined period of time, determining a ratio between the projected usage of data and the remaining amount of data available; and
dynamically generating, by the server computer system using at least one processor, a modified version of the subject web page in response to the projected usage of data by the client device being determined to be greater than the remaining amount of data available for use by the client device for the current predefined period of time, the modified version of the subject web page including less data than the subject web page, wherein an amount of data reduction between the subject web page and the modified version of the subject web page is proportional to the determined ratio.

2. The method of claim 1, further comprising communicating the modified version of the subject web page to the client device in which the modified version of the subject web page utilizes less bandwidth than the subject web page would if the subject web page were to be communicated to the client device.

3. The method of claim 1, further comprising omitting, from the modified version of the subject web page, a secondary data object of the subject web page.

4. The method of claim 3, further comprising omitting the secondary data object from the modified version of the subject web page based on an importance indicator of the secondary data object.

5. The method of claim 1, further comprising:
reducing the size of an image data object of the subject web page to create a reduced size data object; and
including, in the modified version of the subject web page, the reduced size data object in place of the image data object.

6. The method of claim 1, wherein:
the data limit values include a max value indicating a maximum amount of data that can be transmitted over the network using the client device over the predefined period of time; and
the modified version of the subject web page includes less data than the subject web page based on the max value and the projected usage of data.

7. The method of claim 1, wherein:
the data limit values include a data use value indicating an amount of data that has been transmitted over the network by the client device over the current predefined period of time; and
the projected usage of data by the client device over the remaining time is based on the data use value.

8. The method of claim 1, further comprising communicating to the client device a request to permit access to the data limit values.

9. The method of claim 1, further comprising reducing an amount of data of the modified version of the subject web page as compared to the subject web page based on how much the projected usage of data is greater than the remaining amount of data.

10. A system comprising:
one or more machine-readable media including instruction data stored thereon;
one or more processors communicatively coupled to the one or more machine-readable media and configured to, in response to executing the instruction data, cause the system to perform operations, the operations comprising:
receiving, at a server computer system that hosts a web application configured to render a subject web page, a request for the subject web page from a client device;
obtaining, from the client device by the server computer system, in response to receiving the request for the subject web page, data limit values including: a total amount of data, as provided over a network of a network access provider, available for use by the client device under a particular data plan of the network access provider over a predefined period of time, and a remaining amount of data available for use by the client device for a current predefined period of time from when the request is received to when the current predefined period of time expires;
determining a projected usage of data by the client device over a remaining time of the current predefined period of time from when the request is received based on an historical average amount of data used by the client device; and
dynamically generating by the server computer system, a modified version of the subject web page in response to projected usage of data by the client device being determined to be greater than the remaining amount of data available for use by the client device for the current predefined period of time, the modified version of the subject web page including less data than the subject web page, wherein an amount of data reduction between the subject web page and the modified version of the subject web page is based on a ratio between the projected usage of data and the remaining amount of data available for use by the client device for the current predefined period of time such that the amount of data reduction increases as the projected usage of data over the remaining amount of data increases.

11. The system of claim 10, wherein the operations further comprise communicating the modified version of the subject web page to the client device in which the modified version of the subject web page utilizes less bandwidth than the subject web page would if the subject web page were to be communicated to the client device.

12. The system of claim 10, wherein the operations further comprise omitting, from the modified version of the subject web page, a secondary data object of the subject web page.

13. The system of claim 12, wherein the operations further comprise omitting the secondary data object from the modified version of the subject web page based on an importance indicator of the secondary data object.

14. The system of claim 10, wherein the operations further comprise:
reducing the size of an image data object of the subject web page to create a reduced size data object; and
including, in the modified version of the subject web page, the reduced size data object in place of the image data object.

15. The system of claim 10, wherein:
the data limit values include a max value indicating a maximum amount of data that can be transmitted over the network using the client device over the predefined period of time; and
the modified version of the subject web page includes less data than the subject web page based on the max value and the projected usage of data.

16. The system of claim 15, wherein:
the data limit values include a data use value indicating an amount of data that has been transmitted over the network by the client device over the current predefined period of time; and
the projected usage of data by the client device over the remaining time is based on the data use value.

17. The system of claim 10, wherein the client device is a mobile device.

18. The system of claim 10, wherein the operations further comprise reducing an amount of data of the modified version of the subject web page as compared to the subject web page based on how much the projected usage of data is greater than the remaining amount of data.

19. A non-transitory machine-readable medium having instruction data executable by a machine to cause the machine to perform operations comprising:
receiving, at a server computer system that hosts a web application configured to render a subject web page, a request for the subject web page from a client device;
in response to receiving the request for the subject web page obtaining, from the client device by the server computer system that receives the request for the subject web page, data limit values including: a total amount of data, as provided over a network of a network access provider, available for use by the client device under a particular data plan of the network access provider over a predefined period of time; an amount of data that has been transmitted over the network using the client device during a current predefined period of time; and a remaining amount of time from when the request was received to when the current predefined period of time expires;
determining a projected usage of data by the client device over the remaining amount of time based on an historical average of data usage by the client device, the amount of data that has been transmitted over the network during the current predefined period of time, and the remaining amount of time;
determining a remaining amount of data available for use by the client device for the current predefined period of time based on the total amount of data available for use and the amount of data that has been transmitted over the network during the current predefined period of time; and
dynamically generating, by the server computer system, a modified version of the subject web page in response to the determined projected usage of data being greater than the determined remaining amount of data available for use by the client device for the current predefined period of time, the modified version of the subject web page including less data than the subject web page, wherein an amount of data reduction between the subject web page and the modified version of the subject web page is proportional to how much the projected usage of data is greater than the remaining amount of data available for use by the client device for the current predefined period of time such that the amount of data reduction increases as the projected usage of data over the remaining amount of data increases.

20. The non-transitory machine-readable medium of claim 19, wherein the operations further comprise reducing an amount of data of the modified version of the subject web page as compared to the subject web page based on how much the projected usage of data is greater than the remaining amount of data.

* * * * *